US008230501B2

(12) United States Patent
Haustein et al.

(10) Patent No.: US 8,230,501 B2
(45) Date of Patent: Jul. 24, 2012

(54) CONTROLLING ACCESS TO AN AUTOMATED MEDIA LIBRARY

(75) Inventors: Nils Haustein, Soergenloch (DE); Frank Krick, Ockenheim (DE); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 568 days.

(21) Appl. No.: 12/355,383

(22) Filed: Jan. 16, 2009

(65) Prior Publication Data

US 2009/0278654 A1 Nov. 12, 2009

Related U.S. Application Data

(63) Continuation of application No. 12/116,801, filed on May 7, 2008.

(51) Int. Cl.
*G06F 21/00* (2006.01)

(52) U.S. Cl. ................ 726/22; 726/26; 726/27; 726/28; 726/29; 726/30; 726/2; 726/3; 726/4; 726/5; 713/168; 713/169; 713/170; 709/217; 709/218; 709/219

(58) Field of Classification Search .................. 726/1–6, 726/26–30; 709/217–219; 713/164–166
See application file for complete search history.

(56) References Cited

U.S. PATENT DOCUMENTS 5,377,269 A * 12/1994 Heptig et al. .................. 726/20
5,819,309 A * 10/1998 Gray ............................ 711/111
6,246,642 B1 * 6/2001 Gardner et al. ............ 369/30.42
6,286,079 B1 * 9/2001 Basham et al. ............... 711/112
6,353,581 B1 * 3/2002 Offerman et al. ............ 369/30.4
6,722,564 B2 * 4/2004 Creager et al. ................ 235/383
6,865,053 B2 * 3/2005 Bengds et al. ............... 360/92.1
7,076,327 B1 * 7/2006 Desai et al. .................. 700/214
7,594,114 B2 * 9/2009 Hooker et al. ................ 713/170
2003/0191971 A1 10/2003 Klensin et al.
2005/0177724 A1 * 8/2005 Ali et al. ....................... 713/168
2007/0043958 A1 * 2/2007 Sasaki .......................... 713/194
2007/0239569 A1 10/2007 Lucas et al.

OTHER PUBLICATIONS

K.L. Silvers et. al., Implementation of an Electronic Media Security System, Sep. 6, 2005, IEEE International Workshop on Measurement Systems for Homeland Security.*
Haustein, Nils, U.S. Appl. No. 12/116,801, Office Action dated Mar. 30, 2011.

* cited by examiner

*Primary Examiner* — Taghi Arani
*Assistant Examiner* — Josnel Jeudy
(74) *Attorney, Agent, or Firm* — Yudell, Isidore, Ng and Rusell PLLC; James R. Nock

(57) ABSTRACT

A method of controlling access to an automated media library receives a request or access to the library from an individual having an identity. Access may include importing media to the library, exporting media from the library, and opening a locked door to a cabinet containing the library.

1 Claim, 7 Drawing Sheets

CONTROLLING ACCESS TO AN AUTOMATED MEDIA LIBRARY

CROSS-REFERENCE TO RELATED APPLICATION

The present application is a continuation of co-pending application Ser. No. 12/116,801, filed May 7, 2008, and titled Method of and System for Controlling Access to an Automated Media Library.

BACKGROUND OF THE INVENTION

1. Technical Field

The present invention relates in general to the field of physical security of computer storage media, and more particularly to a method of and system for controlling access to an automated media library.

2. Description of the Related Art

Automated media libraries provide a convenient and efficient means of storing and accessing large amounts of data. The data are stored on movable media, such as magnetic tape cartridges. The movable media are stored in racks or slots in a cabinet. A robotic media handler moves the media back and forth between the racks and slots and one or more media drives in the cabinet. The media drives are connected to a network.

Media can be imported to or exported from the automated media library through an import/export station. The robotic media handler moves media back and forth between the library and the import export station. Additionally, doors are provided in the cabinet so that service or maintenance technicians can have access to the various mechanical and electrical components within the library cabinet.

Automated media libraries are typically located in rooms that provide various levels of physical access control. At smaller installations, the media library may be located in a normal office. At larger installations, media libraries may be located in special dedicated rooms. The special dedicated rooms are typically locked and require a badge or the like to enter the room. Some organizations require that people requesting access to a media library be accompanied by a guard or other security personnel.

Despite the security measures currently in place, there still is a possibility that persons having access to media libraries may take media without proper authority. For example, a person may have authority to enter a media library room for certain purposes. However, once in the room, the person may improperly take media from a library and the room.

Data theft is a serious issue. It poses a risk for the intellectual property of the company. Additionally, organizations are required by law to protect certain employee records. Financial, product, business plans, trade secrets, and other confidential data must be protected from falling into unauthorized hands.

SUMMARY OF THE INVENTION

The present invention provides a method of and a system for controlling access to an automated media library. The method receives a request for access to the library from an individual having an identity. Access may include importing media to the library, exporting media from the library, and opening a locked door to a cabinet containing the library. If the access includes the importing media, the method moves a robotic media handler to a locked import/export station. If the access includes exporting media, the method moves the requested media to the locked import/export station. If the access includes the opening the door, the method takes a first inventory of the media in the library. The method authenticates the identity of the individual and determines an access level associated with the individual. If the access level is insufficient for the requested access, the method denies the requested access and issues an alert. If the access level is sufficient for the requested access, the method determines if the requested access requires a second authentication. If a second authentication is required, the method prompts the individual to perform the second authentication. If the second authentication is verified, the method logs the access by the individual and grants the access. If the access is granted and the access is importing or exporting media, the method unlocks the import/export station. If the access is granted and the access is opening the door, the method unlocks the door. The method closes and locks the import/export station a predetermined length of time after unlocking the import/export station. The method locks the door a predetermined length of time after unlocking the door and takes a second inventory of the media. The method issues an alert if the second inventory differs from the first inventory.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
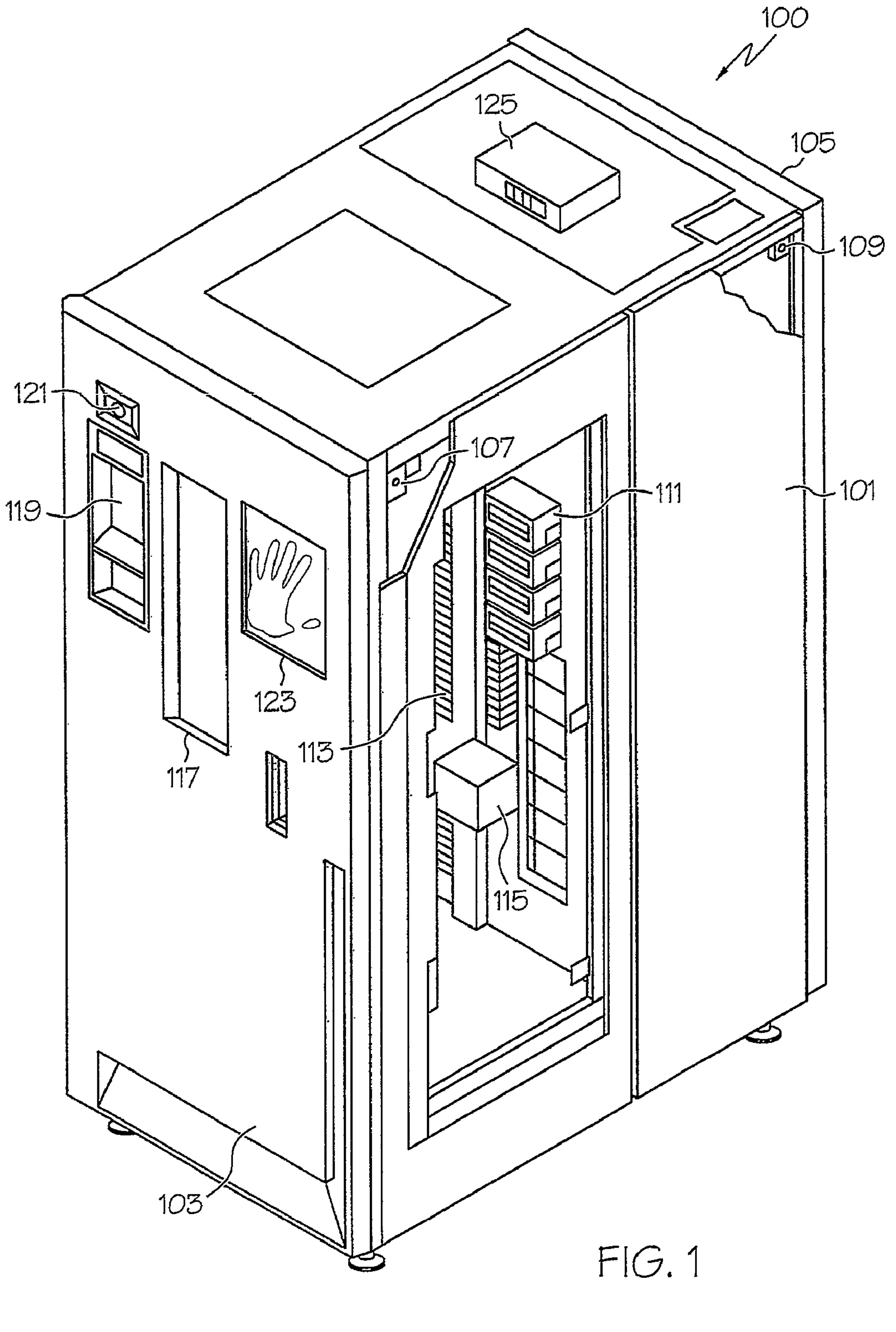
FIG. 1 is a perspective view of an embodiment of an automated media library according to the present invention.

Referring now to drawings, and first to FIG. 1, an embodiment of an automated media library according to the present invention is designated generally by the numeral 100. In the illustrated embodiment, media library 100 is an automated tape library; however, those skilled in the art will recognize that media library 100 may be adapted for use with other media.

Media library 100 is housed in a cabinet 101. Cabinet 101 is accessible from the outside through a front door 103 and the back door 105. Front door 103 is normally secured by an electronically operated lock 107. Similarly, back door 105 is normally secured by an electronically operated lock 109.

Cabinet 101 houses the mechanical and electrical components of media library 100 as well as the media itself. Media library 100 includes a plurality of tape drives 111. Media library 100 also includes storage slots for tape cartridges, such as tape cartridge 113. A robot 115 is mounted for movement inside cabinet 101 to transport tape cartridges back and forth between the storage slots and the tape drives. Robot 115 may also include a barcode reader (not shown in FIG. 1) for inventorying tape cartridges in the library. Robot 115 is also operable to move tape cartridges back and forth between an import/export station 117 positioned in front door 103. Import/export station is normally secured by an electronically operated lock (not shown in FIG. 1).

Embodiments of the present invention control access to the interior of cabinet 101 by authenticating the identity of persons seeking access. In the embodiment of FIG. 1, authentication may be provided through a combination of user ID and password authentication and biometric authentication. A touch screen 119 is positioned in front door 103. Touch screen 119 is adapted to display prompts and soft keys, or the like, to receive user input. A person seeking access to the interior of cabinet 101 may be prompted to enter a user ID, or the like, and password using touch screen 119. In the illustrated embodiment, the biometric authentication devices include an iris or retina scanner 121 and the hand or fingerprint scanner 123. Processing and control of media library 100 is performed by a controller 125, which may be a personal computer.

Figure 2:
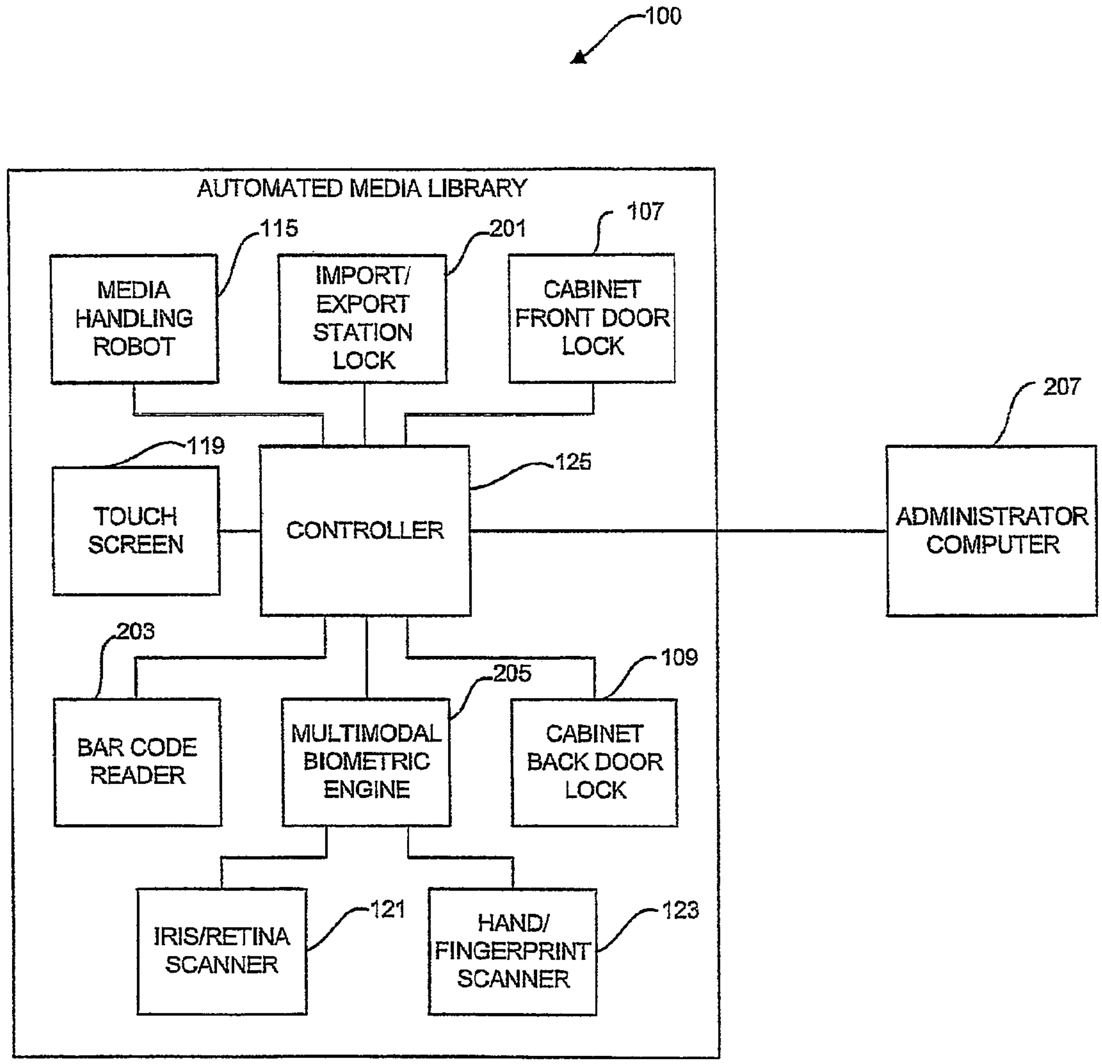
FIG. 2 is a block diagram of an embodiment of automated media library access control system according to the present invention.

The embodiment of the access control system of FIG. 1 is illustrated a block diagram form in FIG. 2. Media handling robot 115, cabinet front door lock 107, touch screen 119, and cabinet back door lock 109 are all in communication with controller 125. In some embodiments, communication may be over a network based on Ethernet and the TCP/IP protocol within automated media library 100. The access control system also includes an electronically operated import/export station lock 201 in communication with controller 125. A barcode reader 203 is also in communication with controller 125. Iris/retina scanner 121 and hand/fingerprint scanner 123 are coupled to a multimodal biometric engine 205, which is in communication with controller 125. Multimodal biometric engine 125 may be a software component of controller 125.

Controller 125 is in communication with an administrator computer 207. Communication between controller 125 and administrator computer 207 may be over a network. Administrator computer 207 may be located in an office or the like separated from automated media library 100. Administrator computer 207 is adapted to receive access log information and alerts from controller 125.

Figure 3A:
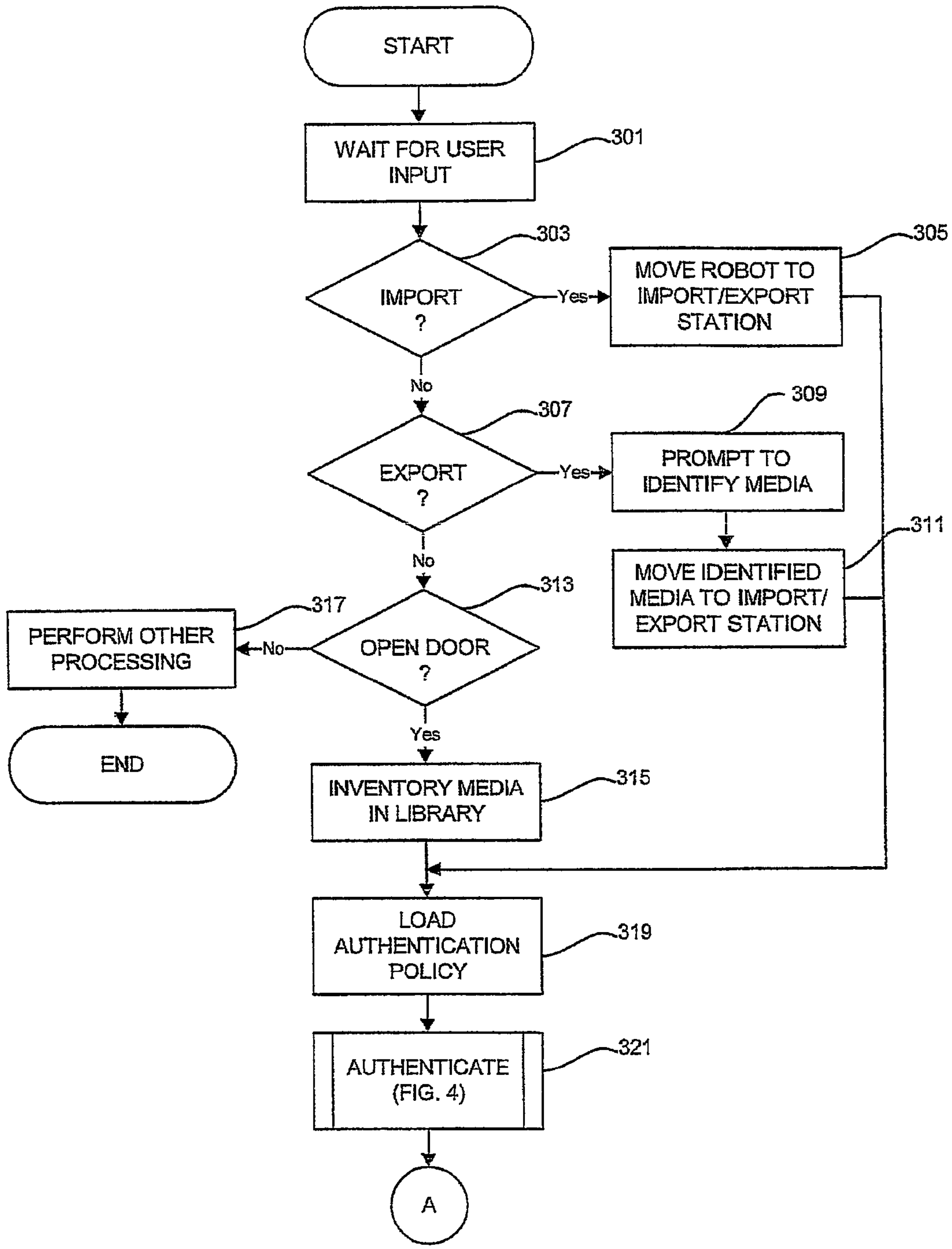
FIG. 3A-FIG. 3C comprise a flow chart an embodiment of automated media library access control processing according to the present invention; and, FIG. 4A-FIG. 3C comprises a flow chart of an embodiment of automated media library access control authentication processing according to the present invention.
Figure 3B:
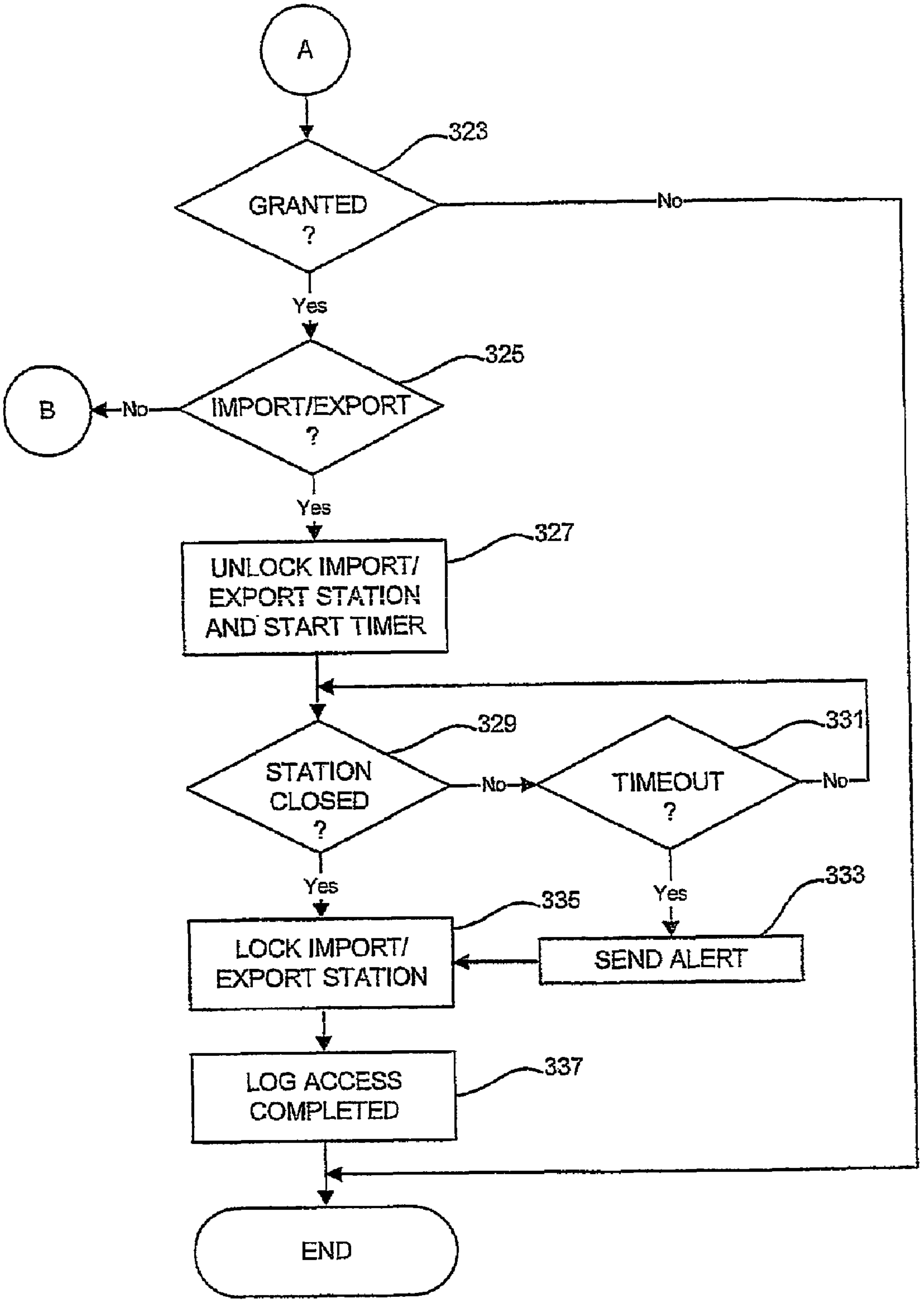
Figure 3C:
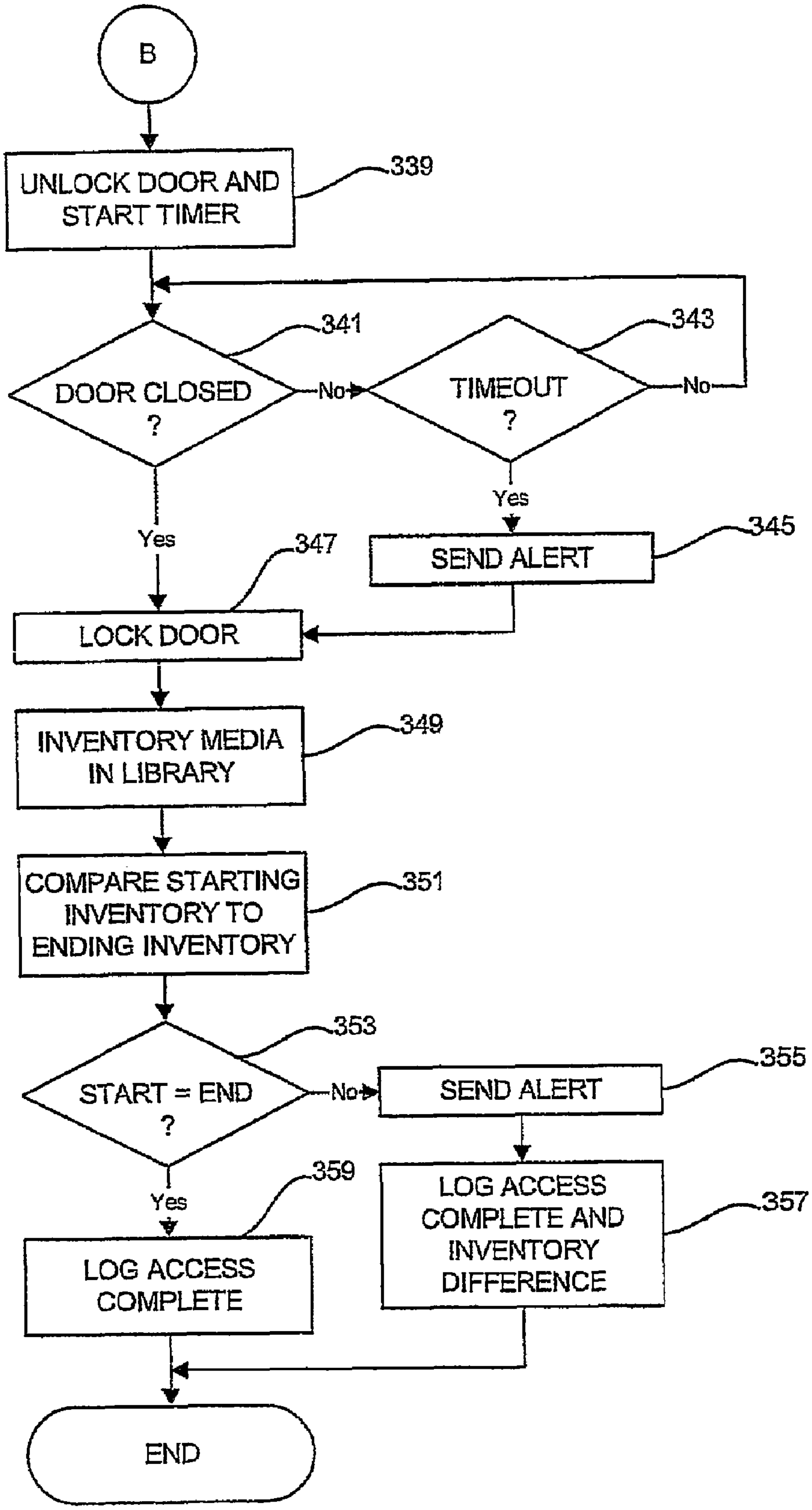

FIG. 3A-FIG. 3C comprise a flow chart of an embodiment of access control processing according to the present invention. Controller 125 waits for user input, as indicated at block 301. The user specifies the operation which might be an import, export or open door request. The user input might be initiated by the user via administrative computer 207 or via the touch screen 119 of the automated library 101. If as determined at decision block 303, the user input is import, controller 125 actuates robot 115 to move to import/export station 117, as indicated at block 305. If, as determined at decision block 307, the user input is export, controller 125 prompts the user to identify the media to be exported, as indicated at block 309. The identification of the tape cartridge is based on the volume serial number which uniquely identifies each tape cartridge in an automated library. The prompts and identification of media may be made using touch screen 119 or via administrative computer 207 depending from where the request in step 301 came. After user has identified the media, controller 125 actuates robot 115 to move the identified media to import/export station 117, as indicated at block 311. If, as determined at decision block 313, the user input is open a door, controller 125 actuates robot 115 and barcode reader 203 to inventory the media in the library, as indicated at block 315. If the user input is other than import, export, or open door, controller 125 performs other processing, as indicated generally at block 317 and subsequently the process ends.

After determining the type of access requested, controller 125 loads the systems authentication policy, as indicated at block 319. The authentication policy provides access authority and authentication levels for various registered users. For example, some requesters (users), such as delivery or mailroom personnel, may have authority to import media to, but not to export media from, the library. Others, such as service or maintenance technicians, may have authority to open the doors of the library cabinet but not to remove media from the library. Also, requesters requesting certain actions may be required to provide higher levels of authentication. After loading the authentication policy, controller 125 performs authentication, as indicated generally at block 321, and described in detail with reference to FIGS. 4A-4C. Referring to FIG. 3B, after authentication, controller 125 determines, at decision block 323 if access is granted. If not, processing ends. If access is granted, controller 125 determines, at decision block 325, if the requested access is import or export. If not, the requested access is to unlock a door and processing continues on FIG. 3C. If the requested access is import or export, controller 125 actuates lock 201 to unlock import/export station 117, as indicated at block 327.

Controller 125 also starts a timer, as indicated at block 327. Then, controller 125 waits for import/export station 117 to be closed, as determined at block decision block 329, or the timer to time out, as determined at decision block 331. If the timer times out before station 117 is closed, controller 125 issues an alert, as indicated at block 333, and actuates lock 201 to lock import/export station 117, as indicated at block 335. Then controller 125 logs access completed, as indicated at block 337. The determination whether the import/export station is opened or closed may be done through sensors associated with the import/export station (not shown).

Referring to FIG. 3C, if access has been granted to open the door, controller 125 operates a door lock 107 and/or 109, thereby allowing door 103 and/or door 105 to be opened, and starts a timer, as indicated at block 339. Then, controller 125 waits for the door to be closed, as determined at block decision block 341, or the timer to time out, as determined at decision block 343. If the timer times out before the door is closed, controller 125 issues an alert, as indicated at block 345, and actuates locks 107 and/or 109 to lock the door or doors, as indicated at block 347. The determination whether the door is opened or closed may be done through sensors associated with the door (not shown).

After locking the door or doors, controller 125 actuates robot 115 and barcode reader 203 to perform a second inventory of the media library, as indicated at block 349. Then, controller 125 compares the starting inventory to the ending inventory, as indicated at block 351. If, as determined at decision block 353, starting inventory is not equal to the ending inventory, controller 125 issues an alert, as indicated at block 355, and logs access complete and the inventory difference, at block 357. If, as determined at decision block 353, the starting inventory equals the ending inventory, controller 125 logs access complete, at block 359, and processing ends.

Figure 4A:
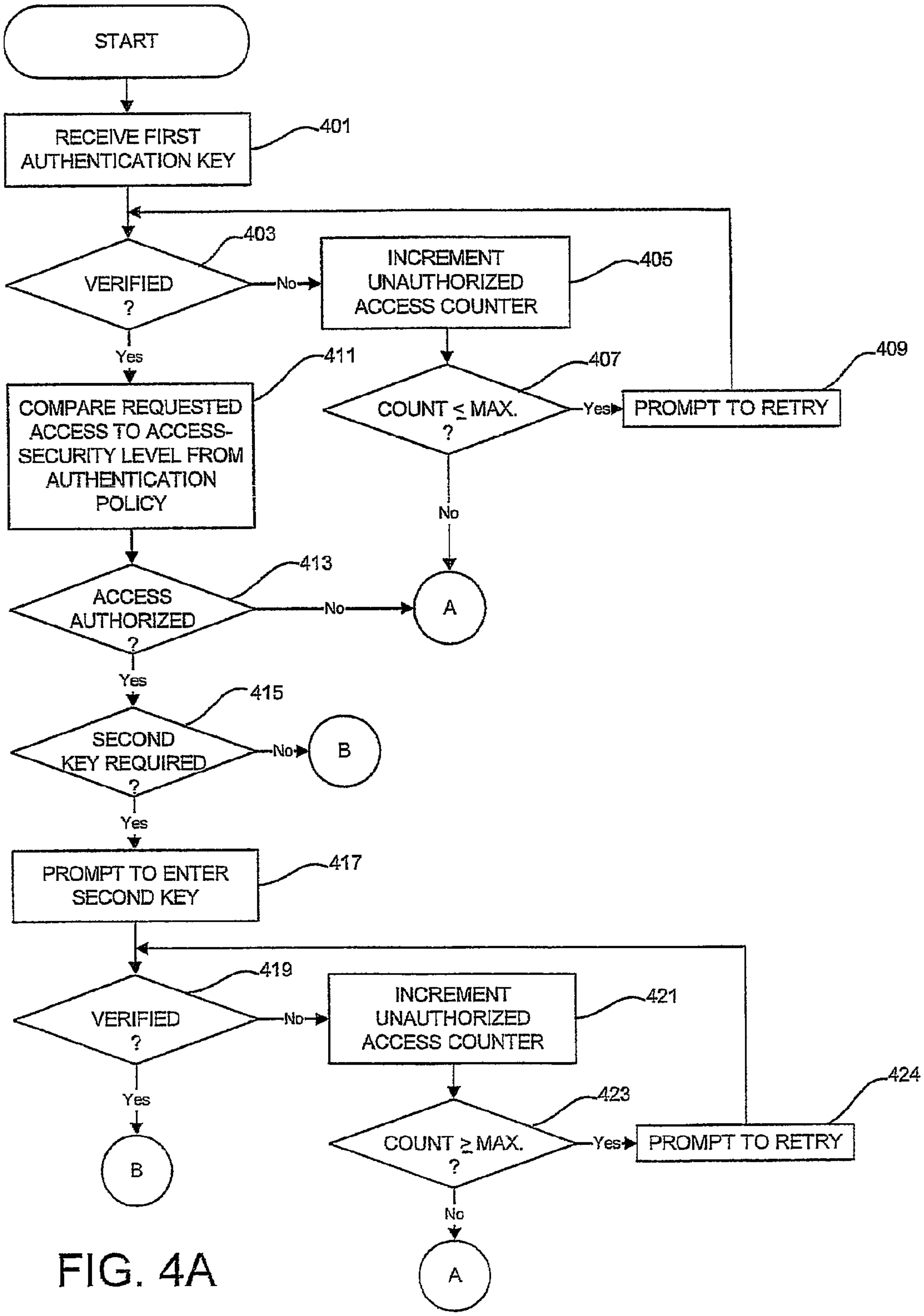
Figure 4B:
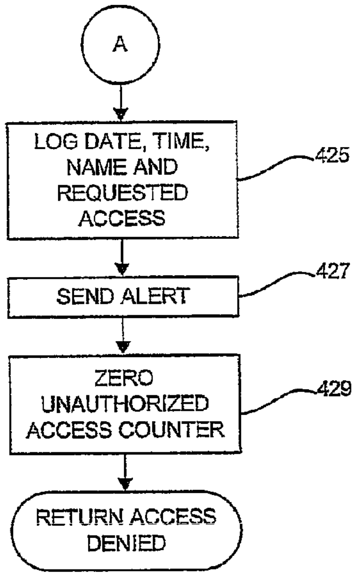
Figure 4C:
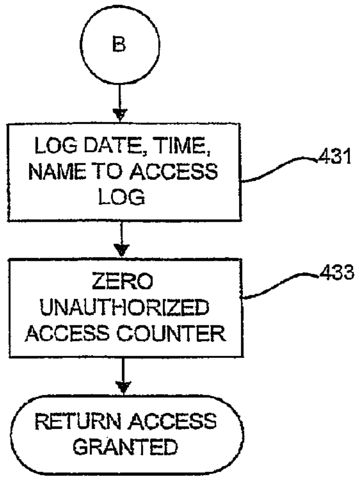

FIGS. 4A-4C comprise a flow chart of an embodiment of authentication according to the present invention. Controller 125 receives a first authentication key, as indicated at block 401. First authentication key may be a user ID and password provided by the user from administrative computer 207 or touch panel 119 of library 101. Controller 125 determines, at decision block 403, if the first authentication key is verified. If not, controller 125 increments an unauthorized access counter, as indicated at block 405. If, as determined at decision block 407, the count is less than or equal to a maximum number of retries, controller 125 prompts the requester (user)

to retry, as indicated at block 409, and the process returns to decision block 403. If the count is greater than the maximum number of retries, the process proceeds to FIG. 4B, where the process logs the date, time, name and requested access, as indicated at block 425, sends an alert, at block 427, and zeros the unauthorized access counter, at block 429. Then, the process returns access denied. The alert sent at block 427 may be an audio or visual alarm, a text message or the like to an administrator or security official, or any other alert.

Returning to decision block 403, if the first authentication key is verified, controller 125 compares the requested access to the access-security level from the authentication policy, as indicated at block 411. If, as determined at decision block 413, the requested access is not authorized to the requester, processing proceeds to FIG. 4B. If access is authorized, controller 125 determines, at decision block 415, if a second key is required. If not, processing proceeds to FIG. 4C where controller 125 logs the date, time, name, and requested access, at block 431, and zeros the unauthorized access counter, at block 433. The process then returns access granted.

If, as determined at decision block 415, a second key is required, controller 125 prompts the requester to enter the second key, as indicated at block 417. The second key may be one or more biometric identifiers. If, as determined at decision block 419, the second key is verified, processing proceeds to FIG. 4C. If the second key is not verified, controller 125 increments the unauthorized access counter, as indicated at block 421. If, as determined at decision block 423, the count is less than or equal to a maximum number of retries, controller 125 prompts the requester to retry, as indicated at block 424, and the process returns to decision block 419. If the count is greater than the maximum number of retries, the process proceeds to FIG. 4B.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A method of controlling access to an automated media library, the method comprising:

receiving a request for access to said library from an individual having an identity, said request for access including an input specifying a type of operation requested by said access;

determining a type of access based on the operation requested from among import of media to said library, export of media from said library, and opening a locked door to a cabinet containing said library;

a controller loading a systems authentication policy which provides access authority and authentication levels for various registered users of the library;

authenticating the identity of said individual;

the controller determining an access level associated with said individual;

if said access level is insufficient for said requested access, denying said requested access and issuing an alert;

if said access level is sufficient for said requested access, determining if said requested access requires a second authentication;

if a second authentication is required, prompting said individual to perform said second authentication;

if said second authentication is verified, logging said access by said individual and granting said access;

if said operation includes opening said door, taking a first inventory of the media in said library;

if said access is granted, unlocking said door;

starting a timer when the door is unlocked;

locking said door a predetermined length of time, based on the timer, after unlocking said door;

taking a second inventory of said media after locking the door;

comparing the second inventory with the first inventory; and issuing an alert if said second inventory differs from said first inventory.

* * * * *